No. 783,262. PATENTED FEB. 21, 1905.
L. GRANSAC.
LEVER MECHANISM.
APPLICATION FILED NOV. 27, 1903.

No. 783,262. Patented February 21, 1905.

UNITED STATES PATENT OFFICE.

LOUIS GRANSAC, OF TOULOUSE, FRANCE.

LEVER MECHANISM.

SPECIFICATION forming part of Letters Patent No. 783,262, dated February 21, 1905.

Application filed November 27, 1903. Serial No. 182,859.

*To all whom it may concern:*

Be it known that I, LOUIS GRANSAC, a citizen of the French Republic, residing at Toulouse, Haute-Garonne, France, have invented certain new and useful Improvements in Lever Mechanism, of which the following is a full, clear, and exact specification.

The present invention relates to an improved lever mechanism for the universal application of power, such mechanism being adapted for the operation of vehicles or carriages, presses, and the like forward and rearward and permitting of the production of considerable force with a minimum effort.

The annexed drawings represent, by way of an example, a lever mechanism of this kind.

Figure 1:
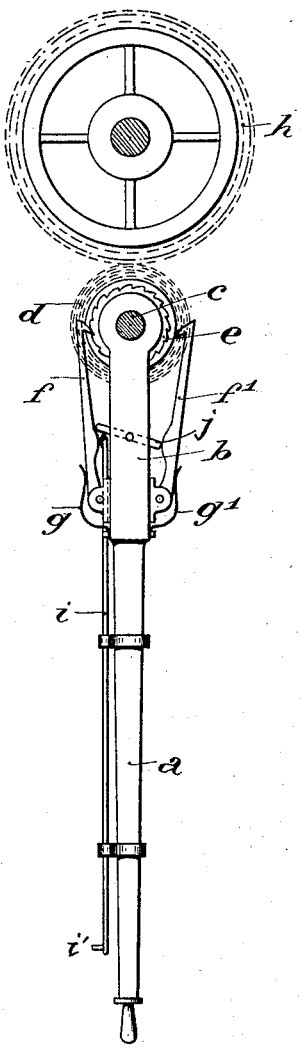
Figure 2:
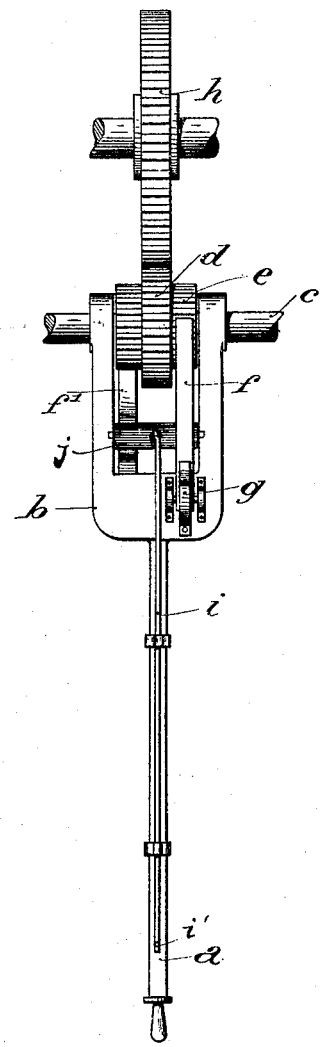

Figure 1 is a front view, and Fig. 2 a side view.

The apparatus comprises a large operating-lever $a$, terminating at one of its extremities in a fork $b$, traversed by an axle or spindle $c$, which serves as the point of support for the operation of the apparatus. In this fork is mounted loosely on the axle or spindle a gear-wheel $d$, having on each side a ratchet-wheel $e$ and $e'$ of a diameter less than that of the wheel $d$. These two ratchet-wheels have their teeth in inverse directions. Pawls $f\ f'$ are pivoted on each side of the fork, as shown, and can be brought into contact with the ratchet-teeth separately, the pawl $f$ engaging the wheel $e$ and pawl $f'$ the wheel $e'$. Springs $g\ g'$ are secured with one end upon the fork and bear with the free end on the pawls. A gear-wheel $h$, in mesh with the pinion $d$, is secured on the shaft of a motor vehicle or carriage, for example, and the spindle $c$ of the apparatus may be supported in any convenient manner and in any suitable position upon said vehicle. On the edge of the lever $a$ a rod $i$ is secured in guides and is connected with means to operate the two pawls in such a manner as to permit of the engagement of one of the pawls and the disengagement of the other and in an intermediate position of the disengagement of both, so as to allow the pinions to revolve freely. To this end a small plate $j$ swings in pivots between the parts forming the fork of the lever, being connected to the rod $i$, so that by pushing or pulling said rod by its handle $i''$ one or the other of the pawls can be put into operation. The said pawls are provided with inner projections or reinforcements opposite said plate, so that both pawls are disengaged when the plate is in its middle position and that one or the other may be allowed to be pressed by its spring $g$ into engagement with its respective ratchet-wheel. It is easy to be understood that the apparatus can operate either in one direction or in the other, according to which pawl is in engagement.

In order to operate the mechanism, the lever $a$ is swung to and fro to allow the pawl to pass over one or more ratchet-teeth. A further slight effort on the extremity of the lever will enable the operator to cause the gear-wheel $h$ to revolve, thereby moving the vehicle to which it is connected.

Having thus described my invention, what I claim, and desire to secure by Letters Patent, is—

A lever mechanism for transferring power, comprising a main operating-lever terminating in a fork, a gear-wheel with oppositely-acting ratchet-wheels on the side loosely mounted on a shaft in said fork, and spring-actuated pawls coöperating with said ratchet-wheels, said pawls having reinforcements on their inner sides, in combination with a plate swinging on pivots between said reinforcements, and a push-rod $i$ suitably guided on the lever $a$, substantially as described and for the purpose set forth.

In witness whereof I have hereunto set my hand in presence of two witnesses.

LOUIS GRANSAC.

Witnesses:
  JEAN AUGUSTE,
  GUILLAUME VABRE.